US00H002104H

(19) United States

(12) Statutory Invention Registration (10) Reg. No.: US H2104 H

Ramesh (43) Published: May 4, 2004

(54) POLYOLEFIN FOAM/FILM COMPOSITE AND METHOD FOR MAKING THE SAME

(75) Inventor: Natarajan S. Ramesh, Danbury, CT (US)

(73) Assignee: Sealed Air Corporation (US), Saddle Brook, NJ (US)

(21) Appl. No.: 09/605,499

(22) Filed: Jun. 28, 2000

(51) Int. Cl.[7] ..... B32B 3/26

(52) U.S. Cl. ..... 428/304.4

(58) Field of Search ..... 428/77, 78, 317.7, 428/318.6, 319.9; 52/396.04, 403.1, 408, 480

(56) References Cited

U.S. PATENT DOCUMENTS

| | | | | |
|---|---|---|---|---|
| 4,368,604 A | | 1/1983 | Spielau et al. | 52/309.8 |
| 4,661,401 A | | 4/1987 | Akao | 428/215 |
| 5,180,628 A | | 1/1993 | Haardt et al. | 428/215 |
| 5,242,750 A | | 9/1993 | Wagner et al. | 428/316.6 |
| 5,473,015 A | | 12/1995 | DeNicola, Jr. et al. | 525/71 |
| 5,516,582 A | | 5/1996 | Hikasa et al. | 428/319.9 |
| 5,691,047 A | | 11/1997 | Kurauchi et al. | 428/315.7 |
| 5,882,776 A | | 3/1999 | Bambara et al. | 428/215 |
| 5,902,674 A | | 5/1999 | Makino et al. | 428/318.6 |
| 5,928,776 A | | 7/1999 | Shioya et al. | 428/316.6 |
| 5,938,878 A | | 8/1999 | Hurley et al. | 156/219 |
| 5,952,076 A | * | 9/1999 | Foster | 428/77 |
| 5,968,630 A | * | 10/1999 | Foster | 428/77 |

OTHER PUBLICATIONS

MT BASE Metallizable OPP Film, AET Packaging Films, Technical Information, Rev 11–99.

B500 Transparent BOPP Film, AET Packaging Films, Technical Information Rev 6–96.

Product Characteristics for BICOR® LBW, Mobil Chemical Company Films Division, Jun. 2, 1997.

* cited by examiner

*Primary Examiner*—Michael J. Carone
*Assistant Examiner*—Aileen B. Felton

(57) ABSTRACT

A composite structure, which includes:

a. a foam sheet comprising polyolefin; and b. a film sheet adhered to the foam sheet, wherein the film sheet (1) comprises polypropylene, (2) is stretch-oriented in at least one direction, (3) has a thickness of less than 0.9 mil, and (4) has a larger surface area than the foam sheet such that at least one edge of the film sheet extends beyond a corresponding edge of the foam sheet.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYOLEFIN FOAM/FILM COMPOSITE AND METHOD FOR MAKING THE SAME

BACKGROUND OF THE INVENTION

The present invention relates generally to polyolefin foam/film composite structures and, more particularly, to such composites that are used as flooring underlayments for laminate floors.

Laminate floors are relatively new flooring materials that may be used in place of more traditional materials, such as wood, tile, or vinyl, but are typically constructed to resemble either wood or tile. Laminate floors generally comprise two or more layers, including a top or surface layer and a core layer. The surface layer is a protective, wear-resistant layer which may contain aluminum oxide particles or other materials that form a hard, durable surface. The core layer to which the surface layer is bonded may comprise high density fiberboard. This wood-based material may include a tongue-and-groove design to allow pieces of the flooring to be bonded together with an adhesive. The laminate may also include a bottom layer to help balance the flooring and add strength.

Laminate floors are commercially available from various manufacturers such as Wilsonart International and Mannington, and are designed to be installed as a floating floor, i.e., not nailed or glued to the subfloor. Instead, the flooring is applied over a floor "underlayment," which is typically a thin layer of polyethylene foam (e.g., less than 0.1 inch), to provide cushioning and sound reduction. When laminate flooring is applied on a concrete sub-floor, it is important that the underlayment also provide a barrier to the passage of water vapor therethrough so that water vapor from the concrete subfloor does not cause the core/fiberboard layer of the laminate floor to deteriorate from rotting. While polyethylene foam provides excellent cushioning and sound reduction, the water vapor transmission rate (WVTR) through polyethylene foam is higher than desired for floor underlayment applications on concrete sub-floors. Further, while many laminate flooring materials include a bottom layer, this layer generally does not provide a barrier to the passage of water vapor.

It has previously been proposed to adhere a sheet of polyethylene film to a sheet of polyethylene foam in order to provide a composite structure having a lower WVTR than a sheet of polyethylene foam alone. While this has proven successful, the WVTR of polyethylene film is such that a thickness of at least 2 mils is required to provide the composite with a sufficiently low WVTR for floor underlayment applications for laminates, which has been determined to be 0.6 grams/100 $in^2$ per 24 hours (measured @ 100° F. and 90% relative humidity) or less. It would be desirable to achieve such a low WVTR with a lower film thickness, thereby using less resin to make the film and, as a result, reducing the cost of the floor underlayment composite.

Further, conventional PE foam/PE film underlayments have proven to have less abuse- and tear-resistance than would otherwise be desired, as installation of such underlayments often take place in rather rough building construction environments where the PE foam component of the underlayment can be too easily torn or punctured, thereby compromising the integrity of the water vapor barrier that the PE film is otherwise intended to provide. It has been determined that an increase in the tensile strength and tear initiation resistance of the film component of foam/film underlayment composites would have a beneficial impact on the abuse- and tear-resistance of the underlayment material.

Accordingly, there is a need in the art for a foam/film composite material for laminate floor underlayment use that has a low WVTR (less than about 0.6 g/100 $in^2$ per 24 hours) but which has greater abuse- and tear-resistance (i.e., toughness) and a thinner film component than current PE foam/PE film underlayment materials.

SUMMARY OF THE INVENTION

That need is met by the present invention, which provides a composite structure, comprising:

a. a foam sheet comprising polyolefin; and b. a film sheet adhered to the foam sheet, wherein the film sheet
   (1) comprises polypropylene,
   (2) is stretch-oriented in at least one direction,
   (3) has a thickness of less than 0.9 mil, and
   (4) has a larger surface area than the foam sheet such that at least one edge of the film sheet extends beyond a corresponding edge of the foam sheet.

Also provided is a method for making a composite structure, including the steps of providing a foam sheet comprising polyolefin and adhering a film sheet as described above to the foam sheet.

The inventor has found that by using a stretch-oriented, polypropylene film, lower MVTR and greater toughness are achieved in the resultant composite structure than a composite structure formed from a polyethylene film that has not been stretch-oriented, e.g., a polyethylene film formed from a blown tube process that is not "stretch-oriented" as that term is defined hereinbelow. As a result, thinner, more economical films can be employed in composite structures for floor underlayment applications while retaining the same and in some cases better properties, e.g., greater toughness, than floor underlayments formed with thicker polyethylene films that are not stretch-oriented.

DETAILED DESCRIPTION OF THE INVENTION

Figure 1:
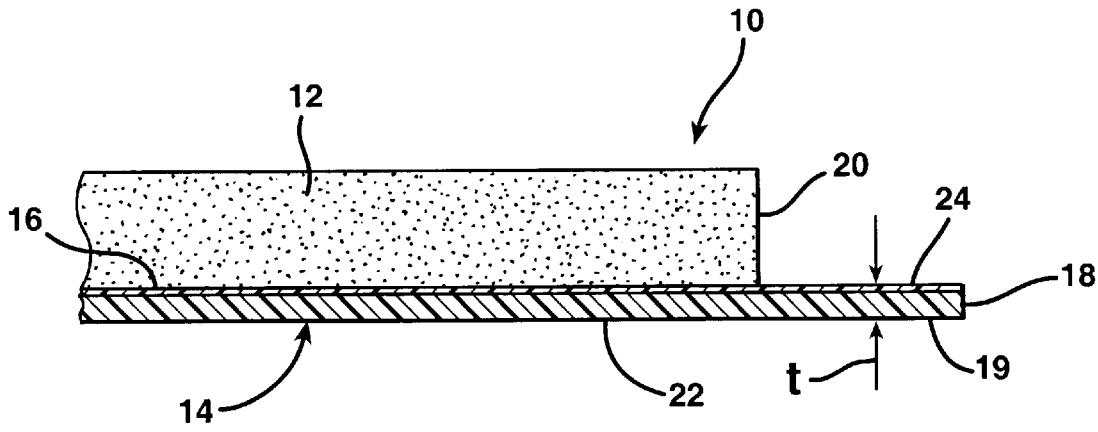
FIG. 1 is an elevational, cross-sectional view of a composite structure in accordance with the present invention.

Referring now to FIG. 1, a composite structure 10 in accordance with the present invention will be described. Such composite structure includes a foam sheet 12 comprising polyolefin, and a film sheet 14 adhered to a surface 16 of the foam sheet. Film sheet 14 comprises polypropylene, is stretch-oriented in at least one direction, has a thickness "t" of less than 0.9 mil, and has a larger surface area than the foam sheet such that at least one edge 18 of the film sheet extends beyond a corresponding edge 20 of foam sheet 12. In this manner, film sheet 14 has an extended portion 19 that extends beyond edge 20 of foam sheet 12. The reason for the extended portion 19 is explained below.

Polyolefin foam sheet 12 preferably comprises polyethylene homopolymer or copolymer. Polyolefin foams, particularly polyethylene (PE) foams, and methods for manufacturing such foams are well known in the art. See, e.g., U.S. Pat. Nos. 5,348,984 (Lee), 5,462,974 (Lee), and 5,667,728 (Lee), the disclosures of which are incorporated herein by reference thereto.

Examples of useful polyethylene homopolymers include low density polyethylene (LDPE) and high density polyethylene. Polyethylene copolymers may include, e.g., homogeneous ethylene/alpha-olefin copolymers (i.e., metallocene/single-site catalyzed copolymers of ethylene and, e.g., one or more $C_3$ to $C_{10}$ alpha-olefin comonomers) or heterogeneous (i.e., Ziegler-Natta catalyzed) ethylene/alpha-olefin copolymers. A preferred polyethylene is low density polyethylene (LDPE) having a melt flow index ranging from about 1 to about 40 and a density ranging from about 0.915 to about 0.930 g/cc.

Foam sheet 12 may have any desired thickness to suit the intended application as a floor underlayment, preferably ranging, e.g., from about 0.004 to about 2 inches, more preferably from about 0.01 to about 1 inch, and most preferably from about 0.05 to about 0.5 inch. The foam may have any desired density, ranging, e.g., from about 1 to about 10 pounds/ft$^3$. The density preferably ranges from about 1.3 to about 5 pounds/ft$^3$ and, more preferably, from about 1.5 to about 3 pounds/ft$^3$. The foam sheet preferably has at least about 70% closed cells, more preferably about 80% closed cells and, most preferably, at least about 90% closed cells.

Any conventional chemical or physical blowing agents may be used to produce the foam. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polyolefin in any desired amount to achieve a desired degree of expansion in the resultant foam. Generally, the blowing agent may be added to the polyolefin in an amount ranging from about 0.5 to 80 parts by weight, based on 100 parts by weight of the polyolefin. More preferably, the blowing agent is present at an amount ranging from 1 to 30 and, most preferably, from 3 to 15 parts per 100 parts by weight of the polyolefin.

If desired or necessary, various additives may also be included with the polyolefin. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process that is well known in the art. In such a process, the polyolefin is added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polyolefin via one or more injection ports in the extruder. Any additives that are used may be added to the melted polyolefin in the extruder and/or may be added with the resin pellets. The extruder pushes the entire melt mixture (melted polyolefin, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

The manufacture of film sheet 14 may be generally accomplished by extruding polypropylene and optionally other resinous materials, which have been heated to their flow or melting point, from an extrusion die in tubular or planar form. After extrusion, or coextrusion where film 14 is a multilayer film, the extrudate is cooled by quenching and then reheated to its orientation temperature. The orientation temperature for a given film will vary with the different resinous polymers and blends thereof which comprise the film, and will generally be a range of temperatures based on such factors. In general, the orientation temperature may be stated to be above room temperature and below the melting point of the film, and will typically be at or near the glass transition temperature of the resins from which the film is made.

The term "stretch-oriented" is used herein to describe the process and resultant product characteristics obtained by stretching and immediately cooling a resinous polymeric material which has been heated to its orientation temperature so as to revise the molecular configuration of the material by physical alignment of the molecules to improve certain mechanical properties of the film such as, for example, tensile strength and tear strength, as well as the optical properties of the film. Importantly, in the context of the present invention, it is also been determined that stretch-orientation decreases the WVTR of a film, i.e., improves the moisture vapor barrier functionality of the film, and also increases the toughness of the film in comparison to films that are not stretch-oriented has herein defined.

The process of stretching a film at its orientation temperature range may be accomplished in a number of ways such as, e.g., by "blown bubble" or "tenter framing" techniques. These and other techniques are well known in the art and involve stretching the film in the cross or transverse direction (TD) and/or in the longitudinal or machine direction (MD). When the stretching force is applied in one direction, uniaxial orientation results. When the stretching force is applied in two directions, biaxial orientation results. After being stretched, the film is rapidly cooled to quench and thus set or lock-in the oriented molecular configuration. Such an oriented and quenched film is said to be "heat-shrinkable," i.e., without heat-setting as described immediately below, the film will tend to return toward its original, unoriented (unstretched) dimensions when subsequently heated to an appropriate temperature below its melting temperature range.

After locking-in the oriented molecular configuration by quenching, film 14 is preferably heat-set by bringing the oriented film to a temperature near its orientation temperature while restraining the film in its stretched dimensions. This process, which is also know as "annealing," produces a film with substantially less shrinkability, while retaining much of the advantages of orientation, including improved tensile strength and optical properties, and also lower WVTR.

Film sheet 14 is preferably stretch-oriented in at least two directions, i.e., is "biaxially oriented," preferably in both the machine direction and transverse direction. Further, the film sheet preferably has an orientation ratio of at least 2 in both of the directions in which it has been oriented; more preferably at least 3, even more preferably at least 4 and, most preferably, an orientation ratio of at least 5 in both directions.

As used herein, the phrase "orientation ratio" refers to the multiplication product of the extent to which a film is expanded in any one direction during the orientation process. Thus, an orientation ratio of, e.g., 2 in the machine direction, indicates that the film has been expanded to twice its original dimension in the machine direction of the film. When a film is biaxially oriented, the orientation ratios are conventionally expressed as "[machine direction (MD) ratio]×[transverse direction (TD) ratio]" or "[TD ratio]×[MD ratio]," however designated. Thus, a biaxial orientation ratio of 2 in the MD and 3 in the TD would be expressed as a "MD×TD orientation ratio of 2×3. "

Preferably, film sheet 14 is as thin as possible, in order to minimize the amount of resin necessary to produce the film, while providing an acceptably low WVTR for floor underlayment applications. Thus, the film sheet has a thickness of 0.9 mil or less, e.g., 0.8 mil or less, 0.7 mil or less, 0.6 mil or less, or 0.5 mil or less. (1 mil=0.001 inch).

As noted above, film sheet 14 comprises polypropylene, preferably biaxially oriented polypropylene (BOPP). When used in composite structure 10, such a film was found to result in an excellent water vapor barrier at a film thickness of 0.6 mil or less, i.e. a maximum WVTR of 0.6 grams/100 $in^2$ per 24 hours @ 100° F. and 90% relative humidity. More specifically, as demonstrated in the Examples below, when a BOPP film having a thickness of 0.6 mil or less is adhered to a foam sheet of LDPE with a thickness of 0.075 inch, the resultant composite structure had a WVTR of less than 0.5 grams/100 $in^2$ per 24 hours @ 100° F. and 90% relative humidity. In comparison, a film formed from blown but not stretch-oriented polyethylene needed to have approximately five times the thickness of BOPP film in order to achieve comparable WVTR results.

In addition, composite structures made from BOPP film in accordance with the invention were observed to have greater toughness than composite structures made from much thicker POLYETHYLENE film. This is due to the fact that BOPP films have a significantly higher tensile strength than blown polyethylene film by at least an order of magnitude. For example, the BICOR® LBW BOPP film used in Example 2 had a tensile strength of 19,000 psi in the MD and 34,000 psi in the TD. The BOPP films used in the other examples had similarly high tensile strengths. In contrast, polyethylene films that are blown but not stretch-oriented, such as used in Comparative Example 1, have tensile strengths of only about 1800 psi in both directions. In addition, BOPP has greater tear-initiation resistance than blown polyethylene film. As a result, composite structures in accordance with the present invention exhibited no tendency to curl and could easily be handled and manipulated, e.g., as they would be during installation. Further, the stretch-oriented polypropylene film also provided such composite structures with greater toughness, i.e., greater abuse-resistance and tear-initiation resistance, than comparable composite structures made from blown polyethylene film.

Various polypropylenes are suitable for film 14, including atactic, isotactic, syndiotactic, long-chain branched, and propylene/ethylene copolymers. In order to facilitate bonding between the foam sheet 12 and film sheet 14, which are comprised of chemically dissimilar materials that do not ordinarily bond well to one another, it may be desirable for film 14 to include a bonding layer. Thus, film sheet 14 preferably includes at least a first layer 22 comprising polypropylene and a second layer 24 interposed between and bonding the film and foam sheets 14, 12 together.

Suitable materials from which second, bonding layer 24 may be constructed include propylene/ethylene copolymer, ethylene-propylene terpolymer (e.g., EPDM), ethylene-butylene random copolymer, polyethylenes ranging in density from 0.91 to 0.96 g/cc, metallocene-catalyzed plastomers and elastomers, ultra low density ethylene/octene copolymer (0.88 to 0.913 g/cc), ionomer, natural rubber, styrene-butadine-stryrene copolymer, styrene-isoprene-styrene copolymer, acrylics, ethylene/vinyl acetate copolymer, ethylene/vinyl alcohol copolymer, flourinated ethylene-propylene copolymer, elastomeric copolymer of ethylene and propylene (e.g., EPR), butyl rubber, ABS, chlorinated polyethylene, PVDC, ACS acrylonitrile-chlorinated polyethylene, and HIPS (high impact polystyrene).

Alternatively, second layer 24 may comprise a reactively modified surface produced on polypropylene layer 22 by a suitable means. A "reactively modified surface" is a film surface that has been chemically altered in order to incorporate reactive species onto such film surface in order to improve the ability of such surface to be adhered to another material. Specific examples of reactive surface modification include corona treatment, plasma (ionized gas) treatment, flame treatment, and chemical treatments. As a further alternative, second layer 24 may comprise a combination of the foregoing bonding means, i.e., layer 24 may comprise one of the bonding materials set forth above with the surface of such layer that is to be in contact with surface 16 of foam sheet 12 having a reactively modified surface thereon.

A less preferred alternative is to bond the film 14 and foam 12 sheets together via adhesive lamination, e.g., wherein layer 24 comprises a pressure-sensitive adhesive or a thermoset adhesive such as a polyurethane adhesive.

Specific examples of suitable films for film sheet 14 are described in the Examples below.

Figure 2:
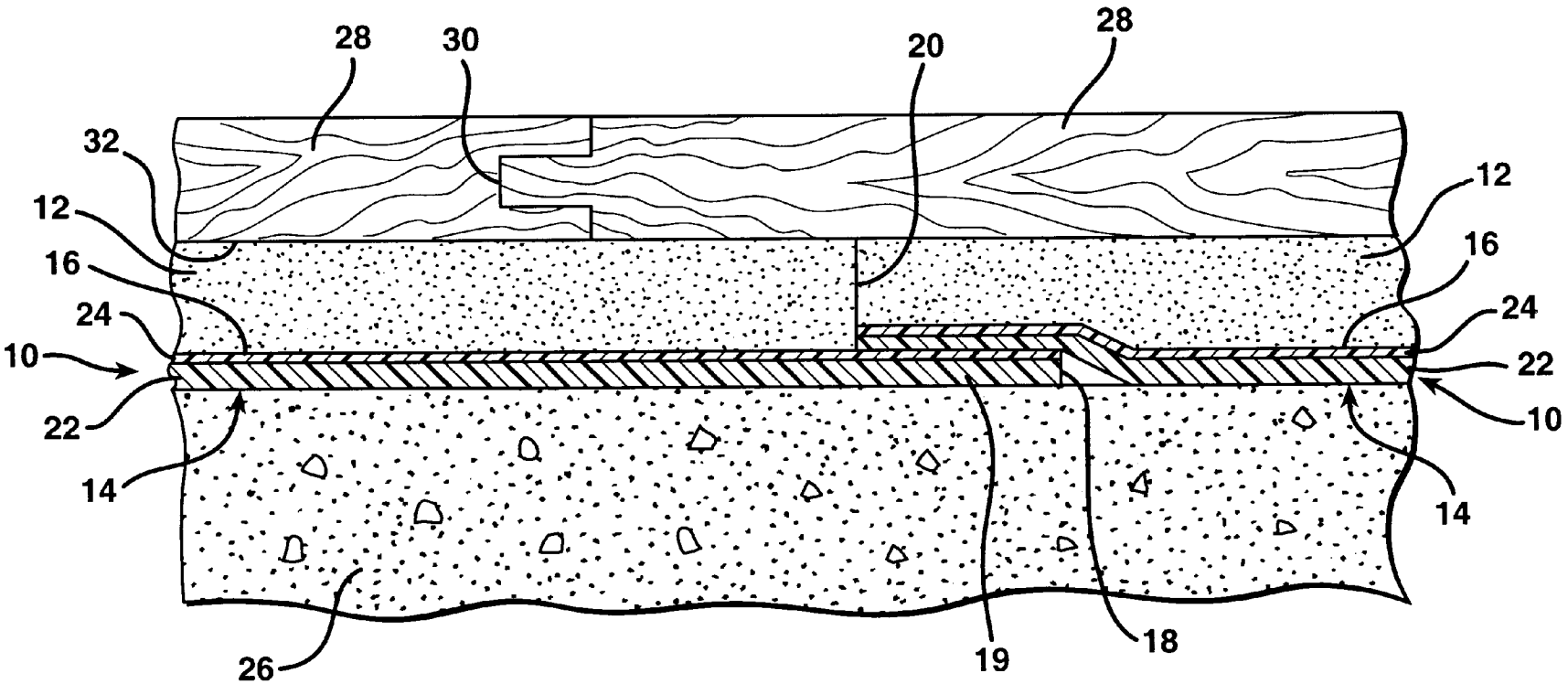
FIG. 2 is an elevational, cross-sectional view of the composite structure illustrated in FIG. 1 used as a floor underlayment.

FIG. 2 shows composite structure 10 in its intended application as a floor underlayment for a laminate floor. As shown, composite structure 10 is positioned on concrete subflooring 26 in a free-lying manner, i.e., not adhered to the subflooring. Composite structure 10 is in the form of strips, two adjacent strips being shown in FIG. 2. Film sheet 14 contacts the top surface of concrete subflooring 26. Planks 28 of laminate flooring, which have the appearance of natural wood flooring, are positioned on composite structure 10 in a free-lying manner. Planks 28 fit together by means of tongue-in-groove arrangement 30 and are glued together (glue not shown). Composite structure 10 is not adhered to laminate flooring planks 28. Foam sheets 12 contact the bottom surface 32 of laminate flooring planks 28.

FIG. 2 shows that extended portion 19 of film sheet 14 of one strip of composite structure 10 underlies the adjacent strip of composite structure 10. In this manner, film sheet 14 provides a continuous water vapor barrier across the entire surface of concrete subflooring 26, i.e., without any gaps as would otherwise occur at the intersection of adjacent strips of the composite structure, thereby protecting the laminate flooring 28 from damage due to exposure to water vapor. The strip of laminate composition 10 which has its extended portion 19 against a wall can be trimmed or cut to fit.

As an alternative, composite structure 10 can be installed so that film sheet 14 contacts laminate flooring 28 and foam sheet 12 contacts concrete subflooring 26.

Figure 3:
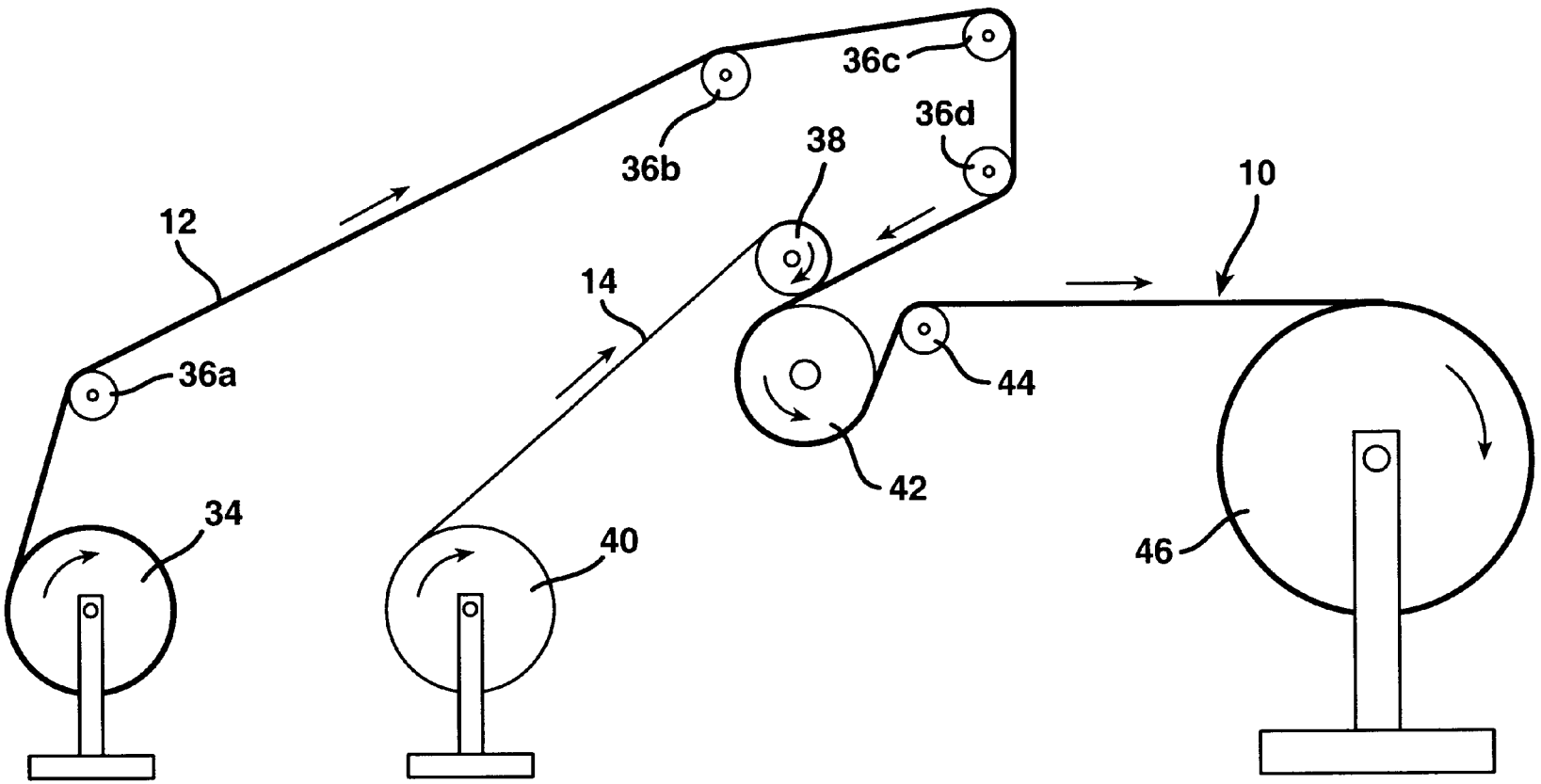
FIG. 3 is a schematic view of a preferred process for making the composite structure shown in FIG. 1.

Having now described composite structures in accordance with the invention, a preferred method for making composite structure 10 will be discussed with reference to FIG. 3, which illustrates the foam sheet 12 and film sheet 14 being adhered via heat lamination. Foam sheet 12 is unwound from a storage roll 34 and sent via guide rollers 36*a–d* to hot roller 38. Simultaneously, film sheet 14 is unwound from storage roll 40, wrapped around hot roller 38 to heat the film, then brought into contact with foam sheet 12 between hot roller 38 and contact roller 42. The lamination process is completed by squeezing the foam/film composite between contact roller 42 and chill roller 44, which both presses the film and foam together sufficiently to cause bonding and cools the resultant composite structure 10 to allow further handling thereof. The composite structure 10 is then wound onto storage roll 46 for future use, e.g., by installers of laminate flooring systems.

The heat supplied to film 14 from hot roller 38 is sufficient to cause the film 14 and foam 12 to bond but preferably without melting either the film or the foam. Excess heat from hot roller 38 results in the complete or partial collapse in the cells of foam sheet 12. It was unexpected that a foam sheet comprising polyethylene could successfully be bonded to a film sheet comprising polypropylene, given their chemical dissimilarity, by mere heat lamination, even with a bonding layer 24 being included with the film sheet 14. Conventional understanding was that either extrusion lamination, wherein one or both of foam and film sheets 12, 14 would need to be melted just prior to being combined, or expensive and environmentally unfriendly adhesive lamination would be required to bond the PE foam and PP film sheets 12, 14.

In order to provide film sheet 14 with extended portion 19, the film sheet 14 preferably is wider than foam sheet 12 so that edge 18 of the film sheet 14 extends beyond a corresponding edge 20 of the foam sheet 12. The widths of both the foam sheet 12 and film sheet 14 may range, e.g., between 20 to 200 inches. The amount that edge 18 of film 14 extends beyond corresponding edge 20 of foam sheet 12 is not critical and may be any desired amount, e.g., between about 1 and 10 inches. Thus, if the width of foam sheet 12 is 60 inches, for example, the width of film sheet 14 may be 64 inches so that the extended portion is 4 inches in width.

These and other aspects and advantages of the invention may be further understood by reference to the following examples, which are provided for illustrative purposes only and are not intended in any way to be limiting.

EXAMPLES

For each of the examples below, polyolefin foam sheets were made by blending, in a tandem extruder, LDPE resin having a density of 918 kilograms/cubic meter (0.918 g/cc) and a melt index of 2 g/10 min., talc, a mixture containing glycerol monostearate and ethanolamide, and butane as a blowing agent. The mixture was extruded out of an annular die, whereupon it expanded into a foam tube and the tube was slit to form a sheet. The resultant foam sheets had a thickness of about 0.075 inch and a density of about 2 pounds/ft$^3$ (pcf). A film sheet was then laminated to a surface of each of the foam sheet by contacting the film with a heated roller maintained at 300° F. and then pressing the film and foam sheets together between the heated roller and a rubber roller as described above with reference to FIG. 3. In each case, the width of the film sheet was greater than that of the foam sheet so that a portion of the film sheet extended beyond the foam sheet by 4 inches.

Example 1 (Comparative)

A monolayer film sheet was made from a blown tube process but without subsequent stretch-orientation. The sheet comprised approximately 65% LLDPE and 35% LDPE and had a thickness of 3.3 mils. This film sheet was laminated to a LDPE foam sheet as described above.

Example 2

A multilayer, coextruded film having a thickness of 0.5 mil and comprising biaxially oriented polypropylene (BOPP) was laminated to a LDPE foam sheet as described above. The film was BICOR® LBW from Mobil Chemical Company, Pittsford, N.Y., and had the structure:

treated PEC/BOPP/treated PP, where "treated PEC" is a layer of corona-treated propylene/ethylene copolymer and "treated PP" is a layer of corona-treated polypropylene. The BOPP layer was stretched to five times its original length in the machine direction and eight times its original length in the transverse direction (i.e., MD×TD orientation ratio of 5×8).

When heat-laminated to 2 pcf LDPE foam as described above, the resultant composite had the structure:

LDPE foam//PEC/BOPP/PP, where the double slash "//" indicates a heat-lamination bond formed between the PEC layer of the film and the LDPE foam sheet.

Example 3

A monolayer film having a thickness of 0.48 mil and comprising biaxially oriented polypropylene (BOPP) was laminated to a LDPE foam sheet as described above. The film was B503 BOPP film from AET Packaging Films, Wilmington, Del., and had reactive surface modification on both surfaces of the BOPP (corona or flame treatment). The BOPP film was stretched to 4 times its original length in the machine direction and 4 times its original length in the transverse direction.

When heat-laminated to 2 pcf LDPE foam as described above, the resultant composite had the structure:

LDPE foam//BOPP film, where the double slash "//" indicates a heat-lamination bond formed between the surface-treated BOPP film and the LDPE foam sheet.

Example 4

A coextruded, multilayer film having a thickness of 0.6 mil and comprising biaxially oriented polypropylene (BOPP) was laminated to a LDPE foam sheet as described above. The film was MT BASE metallizable OPP film from AET Packaging Films, Wilmington, Del., and had the following structure:

treated PP/BOPP/PEC, where "treated PP" is a corona-treated layer of polypropylene and "PEC" is a non-treated layer of propylene/ethylene copolymer.

The BOPP film was stretched to 5 times its original length in the machine direction and 8 times its original length in the transverse direction on a tenter frame orientation apparatus.

When heat-laminated to 2 pcf LDPE foam as described above, the resultant composite had the structure:

LDPE foam// treated PP/BOPP/PEC, where the double slash "//" indicates a heat-lamination bond formed between the treated PP layer of the film and the LDPE foam sheet.

Each of the foregoing films and composites were tested for water vapor transmission rate (WVTR) in accordance with ASTM F 1249. The results are summarized in Table 1.

TABLE 1

| Example | Film Thickness, Mils | WVTR* (film only) | WVTR* for foam/film composite |
|---|---|---|---|
| Example #1 | 0.5 mil | 4.0** | — |
| | 1 mil | 2.0 | — |
| | 3.3 mil | 0.61** | 0.32 |
| Example #2 | 0.5 | 0.70 | 0.46 |
| Example #3 | 0.48 | 0.68 | 0.43 |
| Example #4 | 0.6 | 0.50 | 0.42 |

*Water vapor Transmission Rate in g/100 inch$^2$/24 hrs @ 100 F. and 90% RH
**normalized based on 1 mil film data.

While the invention has been described with reference to illustrative examples, those skilled in the art will understand that various modifications may be made to the invention as described without departing from the scope of the claims which follow.

What is claimed is:

1. A composite structure, comprising:

a. a foam sheet comprising polyolefin; and b. a film sheet adhered to said foam sheet, wherein said film sheet (1) comprises polypropylene, (2) is stretch-oriented in at least one direction, (3) has a thickness of less than 0.9 mil, and (4) has a larger surface area than said foam sheet such that at least one edge of said film sheet extends beyond a corresponding edge of said foam sheet.

2. The composite structure of claim 1, wherein said polyolefin foam sheet comprises polyethylene homopolymer or copolymer.

3. The composite structure of claim 2, wherein said polyolefin foam sheet has a density ranging from about 1 to about 10 pounds/ft$^3$ and a thickness ranging from about 0.004 to about 2 inches.

4. The composite structure of claim 1, wherein said film sheet is stretch-oriented in at least two directions.

5. The composite structure of claim 4, wherein said film sheet has an orientation ratio of at least 2 in both of said at least two directions.

6. The composite structure of claim 1, wherein said film has a thickness 0.6 mil or less.

7. The composite structure of claim 1, wherein said film includes at least a first layer comprising said polypropylene and a second layer interposed between and bonding said film and foam sheets.

8. The composite structure of claim 7, wherein said foam sheet and film sheet are adhered via heat lamination.

9. The composite structure of claim 1, wherein said composite structure has a maximum water vapor transmission rate of 0.6 grams/100 in$^2$ per 24 hours @ 100° F. and 90% relative humidity.

10. The composite structure of claim 9, wherein said composite structure has a maximum water vapor transmission rate of 0.5 grams/100 in$^2$ per 24 hours @ 100° F. and 90% relative humidity.

11. A method for making a composite structure, comprising:

a. providing a foam sheet comprising polyolefin; and b. providing a film sheet and adhering said film sheet to said foam sheet, wherein said film sheet (1) comprises polypropylene, (2) is stretch-oriented in at least one direction, (3) has a thickness of less than 0.9 mil, and (4) has a larger surface area than said foam sheet such that at least one edge of said film sheet extends beyond a corresponding edge of said foam sheet.

12. The method of claim 11, wherein said polyolefin foam sheet comprises polyethylene homopolymer or copolymer.

13. The method of claim 12, wherein said polyolefin foam sheet has a density ranging from about 1 to about 10 pounds/ft$^3$ and a thickness ranging from about 0.004 to about 2 inches.

14. The method of claim 11, wherein said film sheet is stretch-oriented in at least two directions.

15. The method of claim 14, wherein said film sheet has an orientation ratio of at least 2 in both of said at least two directions.

16. The method of claim 11, wherein said film has a thickness 0.6 mil or less.

17. The method of claim 11, wherein said film includes at least a first layer comprising said polypropylene and a second layer interposed between and bonding said film and foam sheets.

18. The method of claim 17, wherein said foam sheet and film sheet are adhered via heat lamination.

19. The method of claim 11, wherein said composite structure has a maximum water vapor transmission rate of 0.6 grams/100 in$^2$ per 24 hours @ 100° F. and 90% relative humidity.

20. The method of claim 19, wherein said composite structure has a maximum water vapor transmission rate of 0.5 grams/100 in$^2$ per 24 hours @ 100° F. and 90% relative humidity.

* * * * *